United States Patent
Bloomfield et al.

(10) Patent No.: US 11,953,478 B2
(45) Date of Patent: Apr. 9, 2024

(54) AGNOSTIC COMPOUND ELUTION DETERMINATION

(71) Applicant: DH TECHNOLOGIES DEVELOPMENT PTE. LTD., Singapore (SG)

(72) Inventors: Nic G. Bloomfield, Newmarket (CA); Lyle Lorrence Burton, Woodbridge (CA); John Lawrence Campbell, Milton (CA); David M. Cox, Toronto (CA); Eva Duchoslav, Toronto (CA); Adam San-Ho Lau, Markham (CA)

(73) Assignee: DH Technologies Development Pte. Ltd., Singapore (SG)

( * ) Notice: Subject to any disclaimer, the term of this patent is extended or adjusted under 35 U.S.C. 154(b) by 381 days.

(21) Appl. No.: 17/593,349

(22) PCT Filed: Mar. 10, 2020

(86) PCT No.: PCT/IB2020/052060
§ 371 (c)(1),
(2) Date: Sep. 16, 2021

(87) PCT Pub. No.: WO2020/194095
PCT Pub. Date: Oct. 1, 2020

(65) Prior Publication Data
US 2022/0187260 A1 Jun. 16, 2022

Related U.S. Application Data

(60) Provisional application No. 62/822,096, filed on Mar. 22, 2019.

(51) Int. Cl.
*H01J 49/00* (2006.01)
*G01N 30/72* (2006.01)
(Continued)

(52) U.S. Cl.
CPC ..... *G01N 30/8631* (2013.01); *G01N 30/7206* (2013.01); *G01N 30/7233* (2013.01);
(Continued)

(58) Field of Classification Search
CPC ........... G01N 30/8631; G01N 30/7206; G01N 30/7233; G01N 30/8686; H01J 49/0031;
(Continued)

(56) References Cited

U.S. PATENT DOCUMENTS

| | | | |
|---|---|---|---|
| 2005/0063864 A1* | 3/2005 | Sano | H01J 49/0031 422/68.1 |
| 2013/0282293 A1* | 10/2013 | Geromanos | G01N 33/6848 250/282 |
| 2016/0231295 A1* | 8/2016 | Tate | G01N 30/72 |

FOREIGN PATENT DOCUMENTS

| | | |
|---|---|---|
| JP | 2011-242255 A | 12/2011 |
| WO | 2012148652 A1 | 11/2012 |

OTHER PUBLICATIONS

International Search Report and Written Opinion for PCT/IB2020/052060, dated Jun. 18, 2020.

* cited by examiner

*Primary Examiner* — Michael Maskell
(74) *Attorney, Agent, or Firm* — Kasha Law LLC; John R. Kasha; Kelly L. Kasha

(57) ABSTRACT

Each of one or more unknown compounds are separated from a sample over a separation time period. Separated compounds are ionized, producing one or more compound precursor ions for each of the unknown compounds and a plurality of background precursor ions. A precursor ion mass spectrum is measured for the combined compound and background precursor ions at each time step of a plurality of time steps spread across the separation time period, producing a plurality of precursor ion mass spectra. One or more (Continued)

background precursor ions are selected from the plurality of precursor ion mass spectra that have a resolving power in a range below a threshold expected resolving power. A separation time is detected for an unknown compound when a decrease in an intensity measurement of the selected background precursor ions over a time period exceeds a threshold decrease in intensity with respect to time.

15 Claims, 12 Drawing Sheets

(51) Int. Cl.
*G01N 30/86* (2006.01)
*H01J 49/04* (2006.01)
*H01J 49/16* (2006.01)
*H01J 49/42* (2006.01)
*H01J 49/44* (2006.01)

(52) U.S. Cl.
CPC ...... *H01J 49/0031* (2013.01); *H01J 49/0418* (2013.01); *H01J 49/167* (2013.01); *H01J 49/4225* (2013.01); *H01J 49/446* (2013.01)

(58) Field of Classification Search
CPC .. H01J 49/0418; H01J 49/167; H01J 49/4225; H01J 49/446; H01J 49/0036
USPC .................................................. 250/281, 282
See application file for complete search history.

AGNOSTIC COMPOUND ELUTION DETERMINATION

RELATED APPLICATIONS

This application claims the benefit of U.S. Provisional Patent Application Ser. No. 62/822,096, filed on Mar. 22, 2019, the content of which is incorporated by reference herein in its entirety.

INTRODUCTION

The teachings herein relate to apparatus for detecting the separation of an unknown compound from a sample. More specifically, a separation device, ion source device, and mass spectrometer are used, respectively, to separate, ionize, and measure the precursor ions of one or more unknown compounds from a sample. The apparatus selects the measurements of one or more background precursor ions based on their resolving power and detects a separation of an unknown compound when an intensity with respect to time measurement of the one or more background precursor ions decreases below a threshold level. In other words, a separation of an unknown compound is detected when a gradient of the chromatogram of the background precursor ions dips below or reaches a threshold level.

The apparatus and methods disclosed herein are also performed in conjunction with a processor, controller, microcontroller, or computer system, such as the computer system of FIG. 1.

Separation Time Detection

In separation device coupled mass spectrometry (MS) experiments, the time at which a compound separates from the separation device is an important parameter that is used to identify the compound. In liquid chromatography coupled mass spectrometry (LC-MS) this time is referred to as the elution time or retention time. In capillary electrophoresis coupled mass spectrometry (CE-MS), for example, this time is referred to as the migration time.

Unfortunately, detecting the separation time of some unknown compounds is confounded by the ionization of these compounds in the ion source device. In some cases, the unknown compounds do not form the expected protonated molecules. In other cases, they readily form adducts with alkali metal salts, ammonium ions. In still other cases, these unknown compounds can be very thermally labile (unstable) and can easily fragment in the Ion source device. This instability of an intact, protonated molecule can adversely affect the MS/MS spectra of the expected ion. Specifically, the signal of the expected ion may have a very low signal-to-noise or may be nonexistent altogether.

One example of a poorly ionizing compound is L-glutamic acid. L-glutamic acid, an acidic molecule, is better detected in negative mode in its deprotonated form. In its protonated form, however, L-glutamic acid presents a weak M+H ion that is barely detectable.

FIG. 2 is an exemplary plot 200 of the total ion chromatogram (TIC) for a sample that includes L-glutamic acid, which is ionized in positive mode. The elution time of L-glutamic acid is known to be at about 0.3 minutes. However, arrow 210 shows that at about 0.3 minutes no chromatographic peak for the protonated form of L-glutamic acid is found in the TIC.

FIG. 3 is an exemplary plot 300 of the base peak ion chromatogram (BPC) for a sample that includes L-glutamic acid, which is ionized in positive mode. Again, the elution time of L-glutamic acid is known to be at about 0.3 minutes. However, arrow 310 shows that at about 0.3 minutes no chromatographic peak for the protonated form of L-glutamic acid is found in the BPC. FIGS. 2 and 3 show that the elution time for L-glutamic acid cannot be found from the TIC or the BPC.

FIG. 4 is an exemplary plot 400 of the mass spectrum at a time between 0.279 and 0.292 min for a sample that includes L-glutamic acid, which is ionized in positive mode. Protonated L-glutamic acid is known to have an m/z of 148. Arrow 410 shows that the weak signal of protonated L-glutamic acid is not discernible in plot 400.

FIG. 5 is an exemplary plot 500 of the mass spectrum at a time between 0.279 and 0.292 min after background subtraction for a sample that includes L-glutamic acid, which is ionized in positive mode. In plot 500, peak 510 of protonated L-glutamic acid is finally discernable after background subtraction is applied to the mass spectrum.

FIGS. 2-5 show that although protonated L-glutamic acid is indeed being separated and measured, its signal is too weak to be seen easily from the TIC and BPC data. They specifically illustrate how difficult it can be to detect the separation time of a poorly ionizing compound like L-glutamic acid. They also illustrate, in general, the problem of detecting the separation of an unknown compound from a sample due to the ionization of the unknown compound in the ion source device.

As a result, additional apparatus and methods are needed to detect the separation of an unknown compound from a sample when the separation time of the unknown compound is confounded by the ionization of the unknown compound in the ion source device.

Background on Mass Spectrometry Techniques

Mass spectrometers are often coupled with chromatography or other separation systems to identify and characterize separating or eluting compounds from a sample. In such a coupled system, the eluting solvent is ionized, and a series of mass spectra are obtained from the eluting solvent at specified time intervals called separation (elution or retention) times. These separation times range from, for example, 1 second to 100 minutes or greater. The series of mass spectra form a chromatogram, or extracted ion chromatogram (XIC).

Peaks found in the XIC are used to identify or characterize a peptide or compound in the sample. More particularly, the separation times of peaks and/or the area of peaks are used to identify or characterize (quantify) a known peptide or compound in the sample.

In separation coupled mass spectrometry, the precursor ions of separated compounds are generally mass analyzed by a mass spectrometer. In some separation coupled mass spectrometry systems, however, a precursor ion is fragmented, and a fragment or product ion of a compound is selected for analysis. A tandem mass spectrometry or mass spectrometry/mass spectrometry (MS/MS) scan is then performed at each interval of the separation for a mass range that includes the product ion. The intensity of the product ion found in each MS/MS scan is collected over time and analyzed as a collection of spectra, or an XIC, for example.

In general, tandem mass spectrometry, or MS/MS, is a well-known technique for analyzing compounds. Tandem mass spectrometry involves ionization of one or more compounds from a sample, selection of one or more precursor ions of the one or more compounds, fragmentation of the one or more precursor ions into fragment or product ions, and mass analysis of the product ions.

Tandem mass spectrometry can provide both qualitative and quantitative information. The product ion spectrum can be used to identify a molecule of interest. The intensity of one or more product ions can be used to quantitate the amount of the compound present in a sample.

A large number of different types of experimental methods or workflows can be performed using a tandem mass spectrometer. Three broad categories of these workflows are targeted acquisition, information dependent acquisition (IDA) or data-dependent acquisition (DDA), and data-independent acquisition (DIA).

In a targeted acquisition method, one or more transitions of a precursor ion to a product ion are predefined for a compound of interest. As a sample is being introduced into the tandem mass spectrometer, the one or more transitions are interrogated or monitored during each time period or cycle of a plurality of time periods or cycles. In other words, the mass spectrometer selects and fragments the precursor ion of each transition and performs a targeted mass analysis only for the product ion of the transition. As a result, an intensity (a product ion intensity) is produced for each transition. Targeted acquisition methods include, but are not limited to, multiple reaction monitoring (MRM) and selected reaction monitoring (SRM).

In an IDA method, a user can specify criteria for performing an untargeted mass analysis of product ions, while a sample is being introduced into the tandem mass spectrometer. For example, in an IDA method, a precursor ion or MS survey scan is performed to generate a precursor ion peak list. The user can select criteria to filter the peak list for a subset of the precursor ions on the peak list. MS/MS is then performed on each precursor ion of the subset of precursor ions. A product ion spectrum is produced for each precursor ion. MS/MS is repeatedly performed on the precursor ions of the subset of precursor ions as the sample is being introduced into the tandem mass spectrometer.

In proteomics and many other sample types, however, the complexity and dynamic range of compounds are very large. This poses challenges for traditional targeted and IDA methods, requiring very high-speed MS/MS acquisition to deeply interrogate the sample to both identify and quantify a broad range of analytes.

As a result, DIA methods, the third broad category of tandem mass spectrometry, were developed. These DIA methods have been used to increase the reproducibility and comprehensiveness of data collection from complex samples. DIA methods can also be called non-specific fragmentation methods. In a traditional DIA method, the actions of the tandem mass spectrometer are not varied among MS/MS scans based on data acquired in a previous precursor or product ion scan. Instead, a precursor ion mass range is selected. A precursor ion mass selection window is then stepped across the precursor ion mass range. All precursor ions in the precursor ion mass selection window are fragmented and all of the product ions of all of the precursor ions in the precursor ion mass selection window are mass analyzed.

The precursor ion mass selection window used to scan the mass range can be very narrow so that the likelihood of multiple precursors within the window is small. This type of DIA method is called, for example, MS/MS'. In an MS/MS' method, a precursor ion mass selection window of about 1 amu is scanned or stepped across an entire mass range. A product ion spectrum is produced for each 1 amu precursor mass window. The time it takes to analyze or scan the entire mass range once is referred to as one scan cycle. Scanning a narrow precursor ion mass selection window across a wide precursor ion mass range during each cycle, however, is not practical for some instruments and experiments.

As a result, a larger precursor ion mass selection window, or selection window with a greater width, is stepped across the entire precursor mass range. This type of DIA method is called, for example, SWATH acquisition. In a SWATH acquisition, the precursor ion mass selection window stepped across the precursor mass range in each cycle may have a width of 5-25 amu, or even larger. Like the MS/MS' method, all the precursor ions in each precursor ion mass selection window are fragmented, and all of the product ions of all of the precursor ions in each mass selection window are mass analyzed.

SUMMARY

An apparatus, method, and computer program product are disclosed for detecting the separation of an unknown compound from a sample. The apparatus includes a separation device, an ion source device, and a mass spectrometer.

The separation device separates each of one or more unknown compounds from a sample over a separation time period based on a property of the one or more unknown compounds. The ion source device ionizes separated compounds received from the separation device. One or more compound precursor ions are produced for each of the one or more unknown compounds, and a plurality of background precursor ions are also produced.

The mass spectrometer includes a mass analyzer that measures a precursor ion mass spectrum for the combined compound and background precursor ions received from the ion source device at each time step of a plurality of time steps spread across the separation time period, producing a plurality of precursor ion mass spectra. The mass spectrometer selects one or more background precursor ions from the plurality of precursor ion mass spectra that have a resolving power in a range below a threshold resolving power expected for the mass analyzer. The mass spectrometer detects a separation time for one of the one or more unknown compounds when a decrease in an intensity measurement of the one or more selected background precursor ions over a time period exceeds a threshold decrease in intensity with respect to time.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
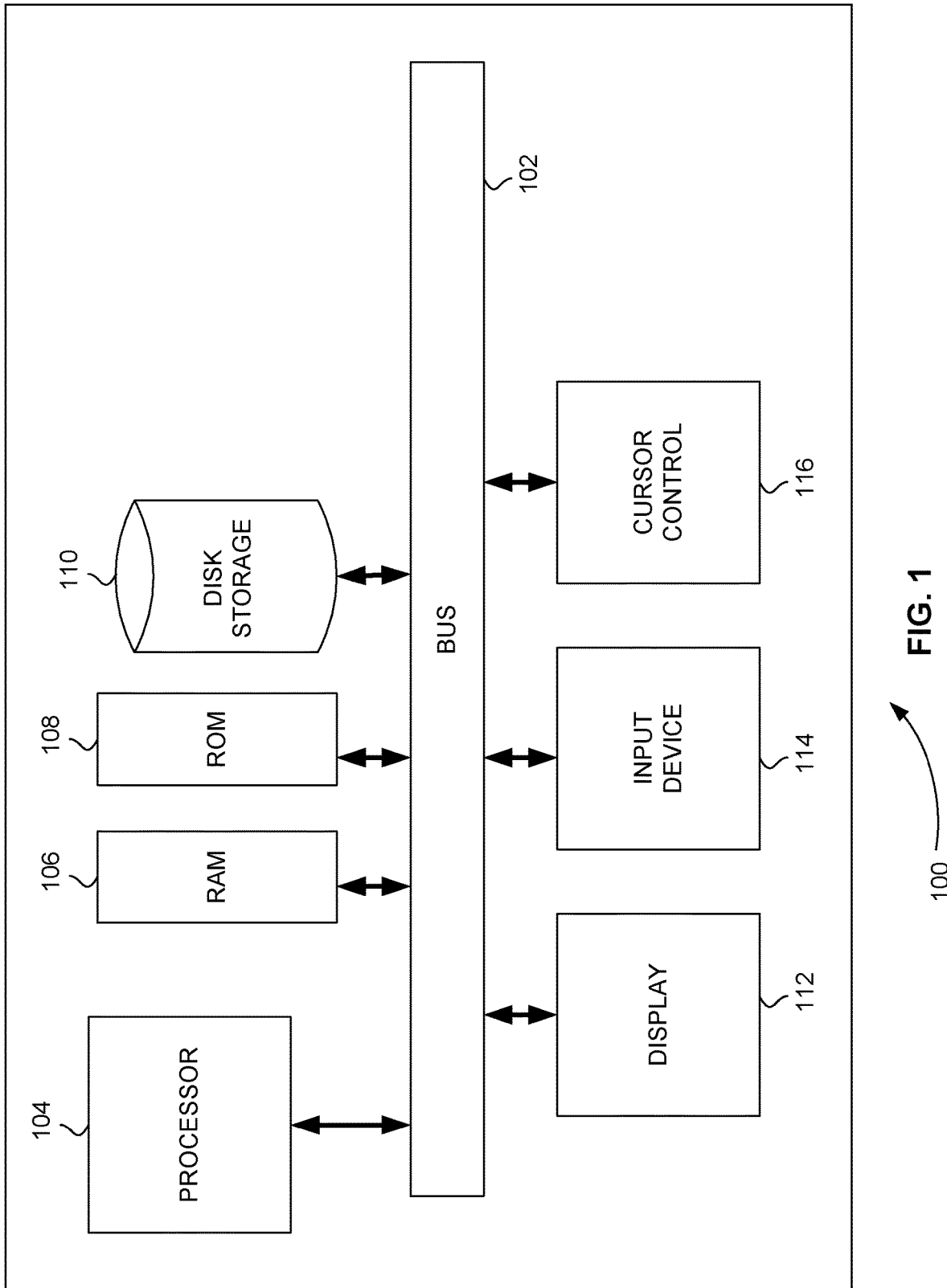
FIG. 1 is a block diagram that illustrates a computer system, upon which embodiments of the present teachings may be implemented.
Figure 2:
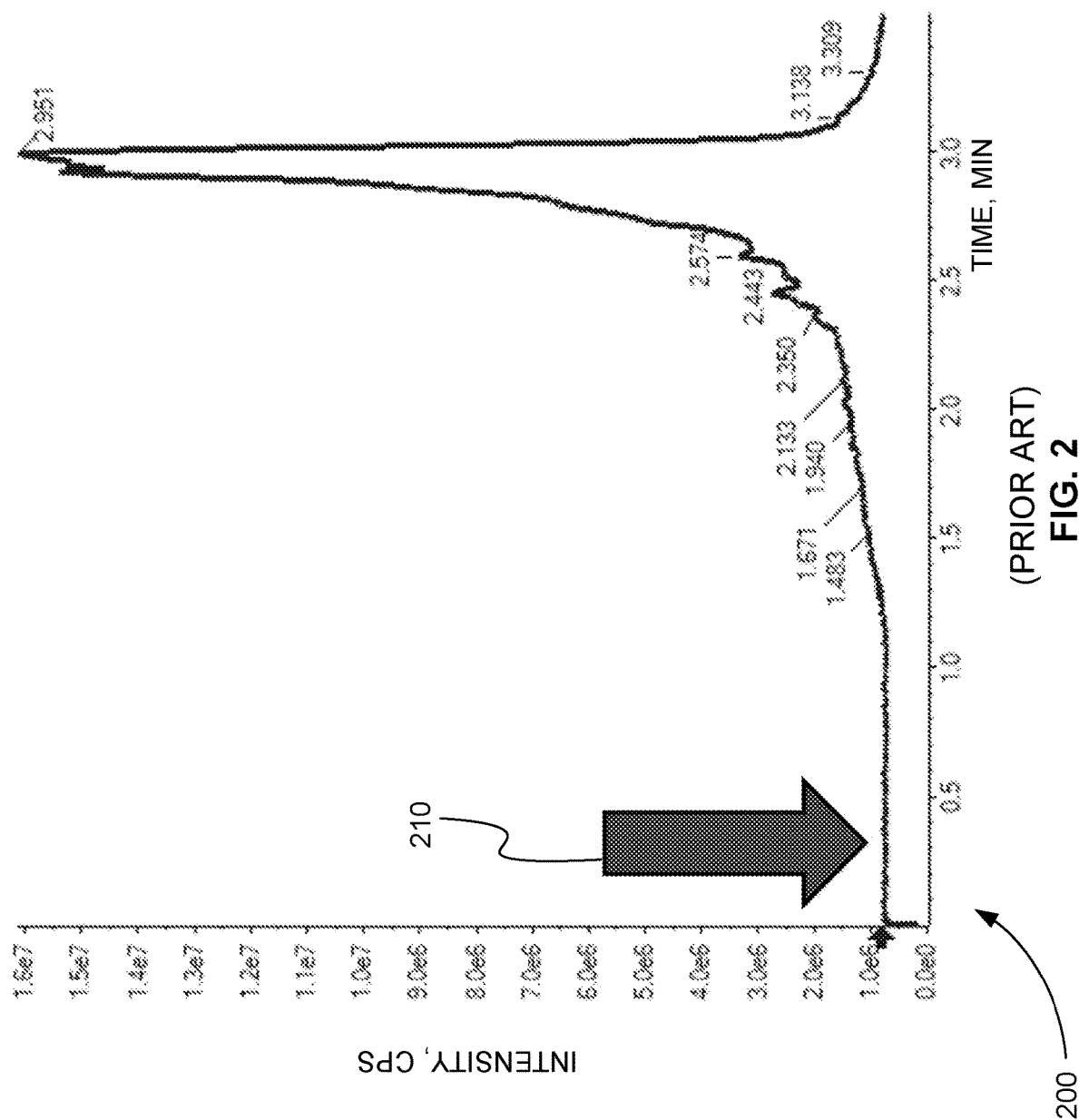
FIG. 2 is an exemplary plot of the total ion chromatogram (TIC) for a sample that includes L-glutamic acid, which is ionized in positive mode. The elution time of L-glutamic acid is known to be at about 0.3 minutes.
Figure 3:
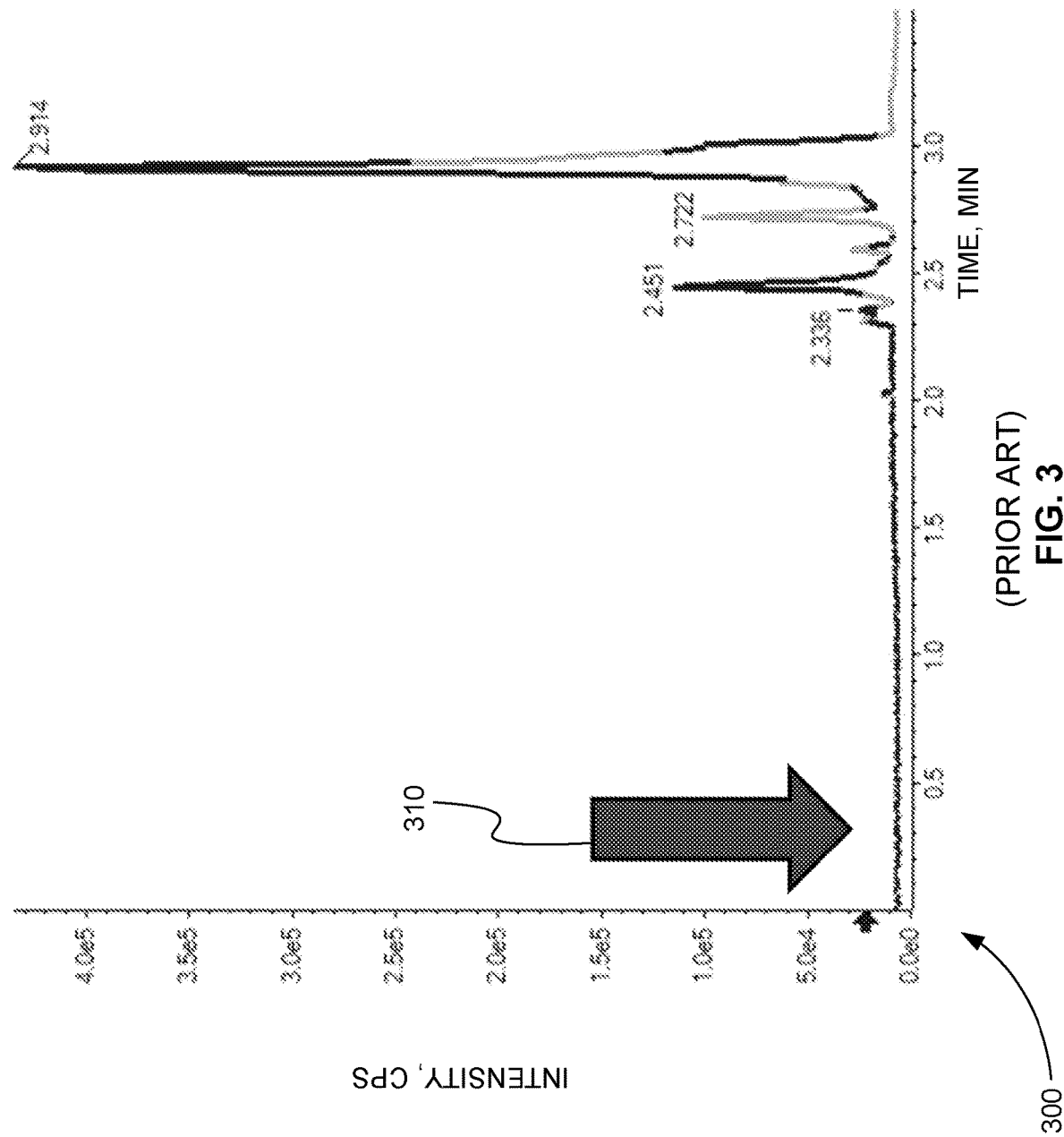
FIG. 3 is an exemplary plot of the base peak ion chromatogram (BPC) for a sample that includes L-glutamic acid, which is ionized in positive mode.
Figure 4:
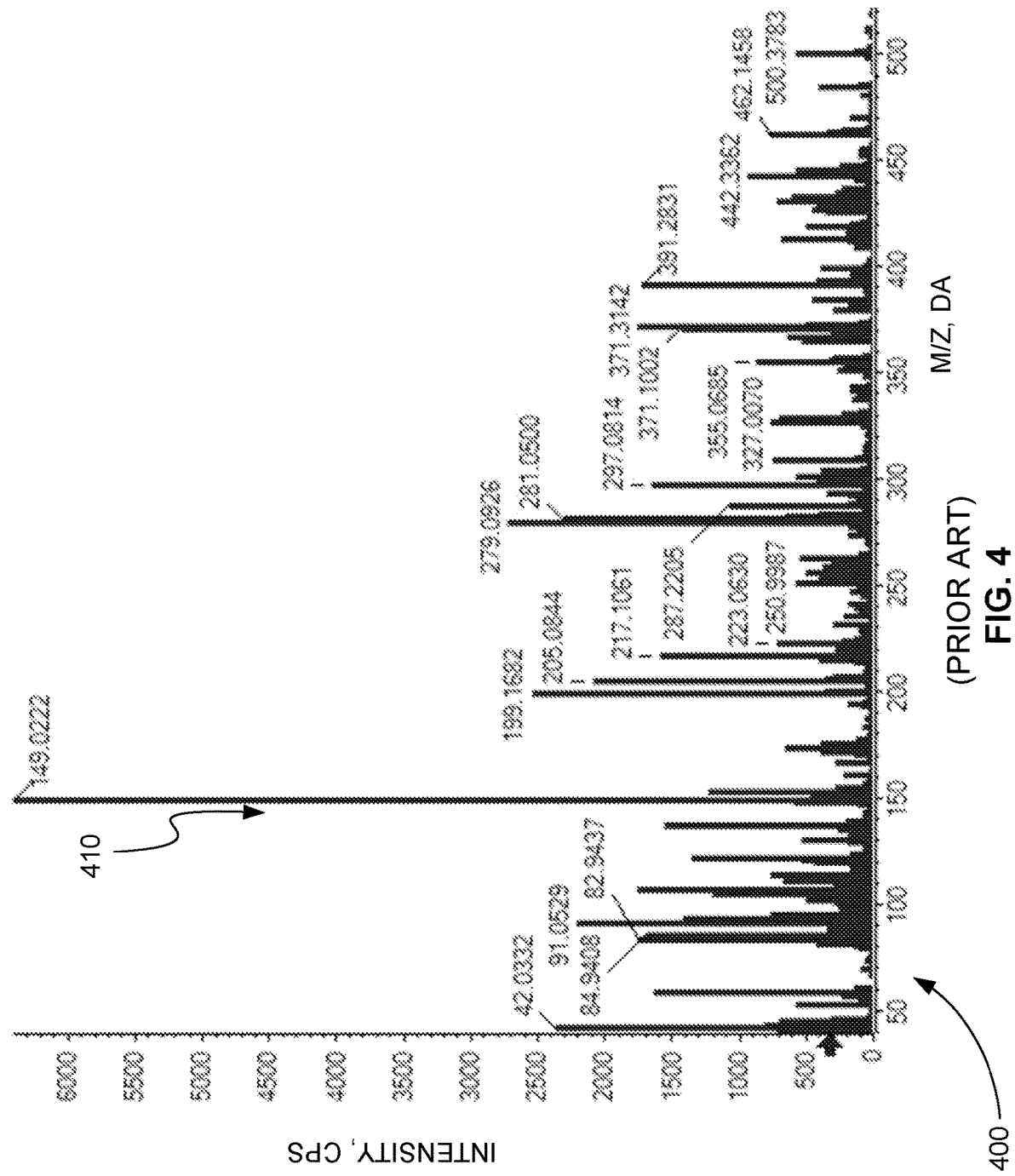
FIG. 4 is an exemplary plot of the mass spectrum at a time between 0.279 and 0.292 min for a sample that includes L-glutamic acid, which is ionized in positive mode.
Figure 5:
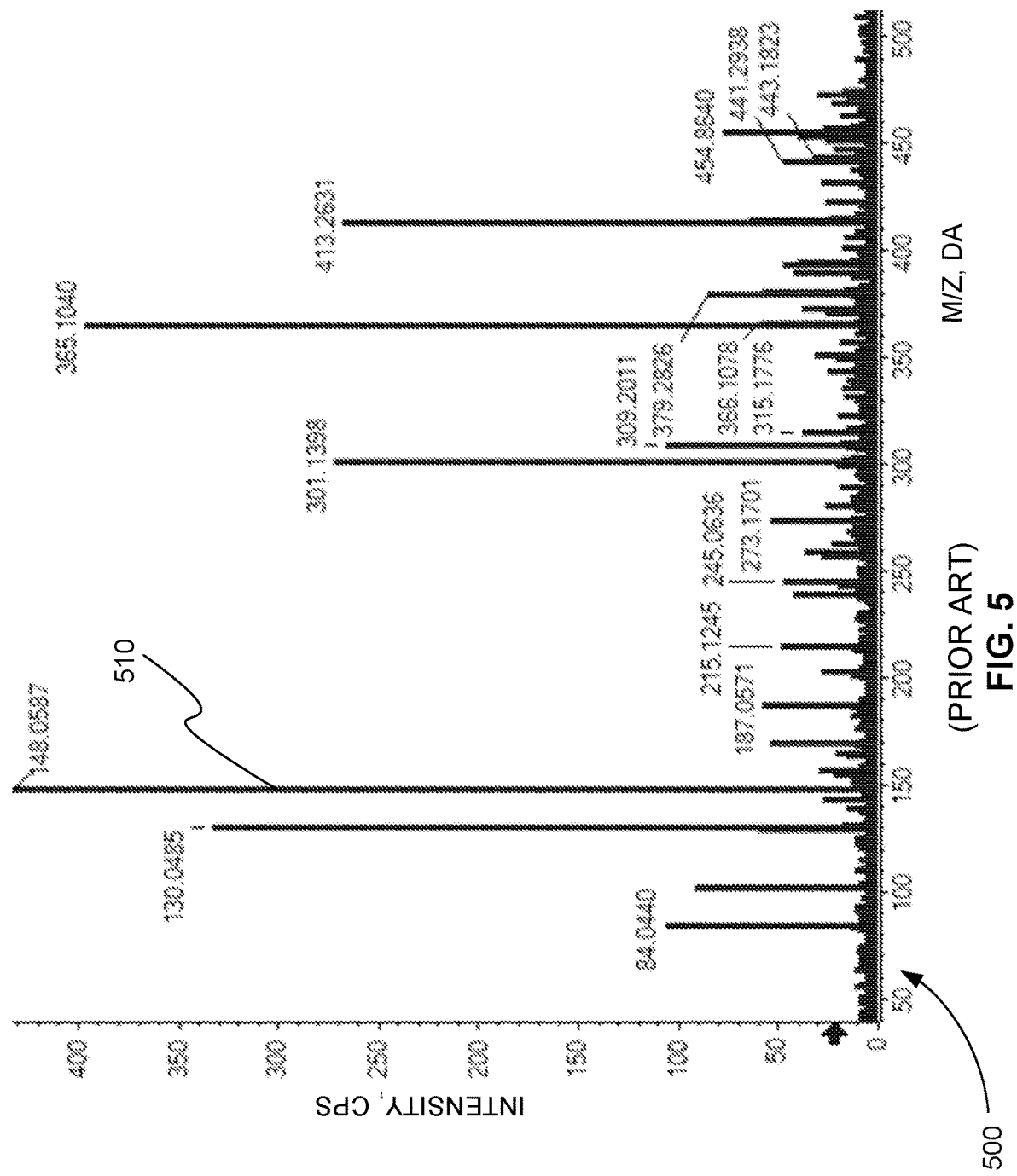
FIG. 5 is an exemplary plot of the mass spectrum at a time between 0.279 and 0.292 min after background subtraction for a sample that includes L-glutamic acid, which is ionized in positive mode.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings Thus implementations of the present teachings are not limited to any specific combination of hardware circuitry and software.

In various embodiments, computer system 100 can be connected to one or more other computer systems, like computer system 100, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Detection of the Separation of an Unknown Compound

As described above, in separation device coupled mass spectrometry (MS) experiments, the time at which a compound separates from the separation device is an important parameter that is used to identify the compound. Unfortunately, detecting the separation time of some unknown compounds is confounded by the ionization of these compounds in the ion source device. During ionization, some unknown compounds do not form the expected protonated molecules, readily form adducts, or fragment in the ion source device, for example.

As a result, additional apparatus and methods are needed to detect the separation of an unknown compound from a sample when the separation time of the unknown compound is confounded by the ionization of the unknown compound in the ion source device.

In various embodiments, the indication of compound separation from a separation device is not based upon detection of a given analyte. Instead, the indication of compound separation is based on the depletion of one or more background ions, whose depletion profiles (i.e., times during which their signals decrease) align with the separation of compounds from the separation device. As a result of this, the depletion profile of said background ion will reflect the elution or retention profile of a compound eluting from an LC but that is not successfully detected in its expected protonated molecule form.

In various embodiments, these background ions present as peaks of resolving powers lower than would be expected for ions of a similar mass-to-charge ratio (m/z) value. Resolving power of an m/z ion peak, for example, is calculated by dividing the center m/z of the m/z peak by the full width at half maximum (FWHM) of the m/z peak.

Figure 6:
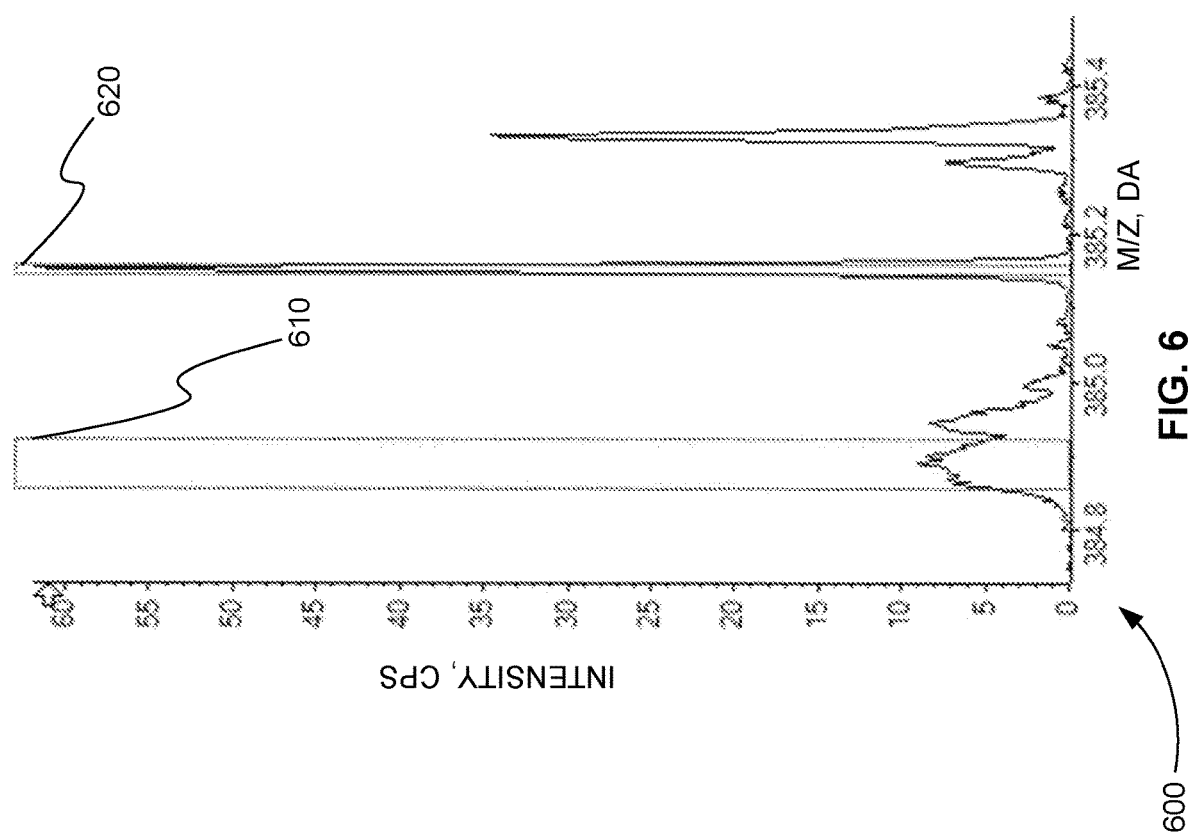
FIG. 6 is an exemplary plot of a portion of a mass spectrum showing mass-to-charge ratio (m/z) peaks that have different resolving powers, in accordance with various embodiments.

FIG. 6 is an exemplary plot 600 of a portion of a mass spectrum showing mass-to-charge ratio (m/z) peaks that have different resolving powers, in accordance with various embodiments. In plot 600, for example, the peak highlighted by box 610 has a wider FWHM than the other peaks in plot 600, It, therefore, has a lower resolving power. The peak highlighted by box 610 has a resolving power of about 7,000, for example. In contrast, the peak highlighted by box 620 has a resolving power of 30,000 or greater.

The ions presenting as lower resolving power peaks are possibly formed in the ion source device. Thus, the peak highlighted by box 610 is likely a background ion formed in the ion source device. The remaining peaks in plot 600 likely represent compounds separated from a sample. The peak highlighted by box 610 does not need to be identified to be used as a background ion. It is selected based on its resolving power, and its intensity and m/z are used to determine the separation of compounds.

As more basic molecules are separated, competition for the protons in the ion source device favors these separating compounds and the background ions produced in the Ion source device summarily drop in intensity. Monitoring the fall in intensity of these background ions with the separation and elution of compounds from the separation device, provides a compound-independent measure of the separation time for compounds of interest.

In various embodiments, the presence of these background ions and their intensity behavior is also used to measure the performance of the separation device. For example, monitoring the fall in intensity of these background ions can serve as confirmation in a liquid chromatography (LC) system that liquid was successfully sampled from a vial and delivered by an autosampler to the LC column.

To verify the correlation between the drop in the intensity of background ions and separation of compounds from a sample, an experiment was conducted. An independent data analysis method (IDA) was performed on metabolite samples (6600, DuoSpray source, 200 uL/min LC flow). This experiment identified the presence of the background ions that decreased in intensity as molecules eluted from an LC column. The correlation between the drop in the intensity of the background ions and separation of the metabolites from a sample was shown by comparing an extracted ion chromatogram (XIC) for a single background ion with a simple base peak chromatogram (BPC).

Figure 7:
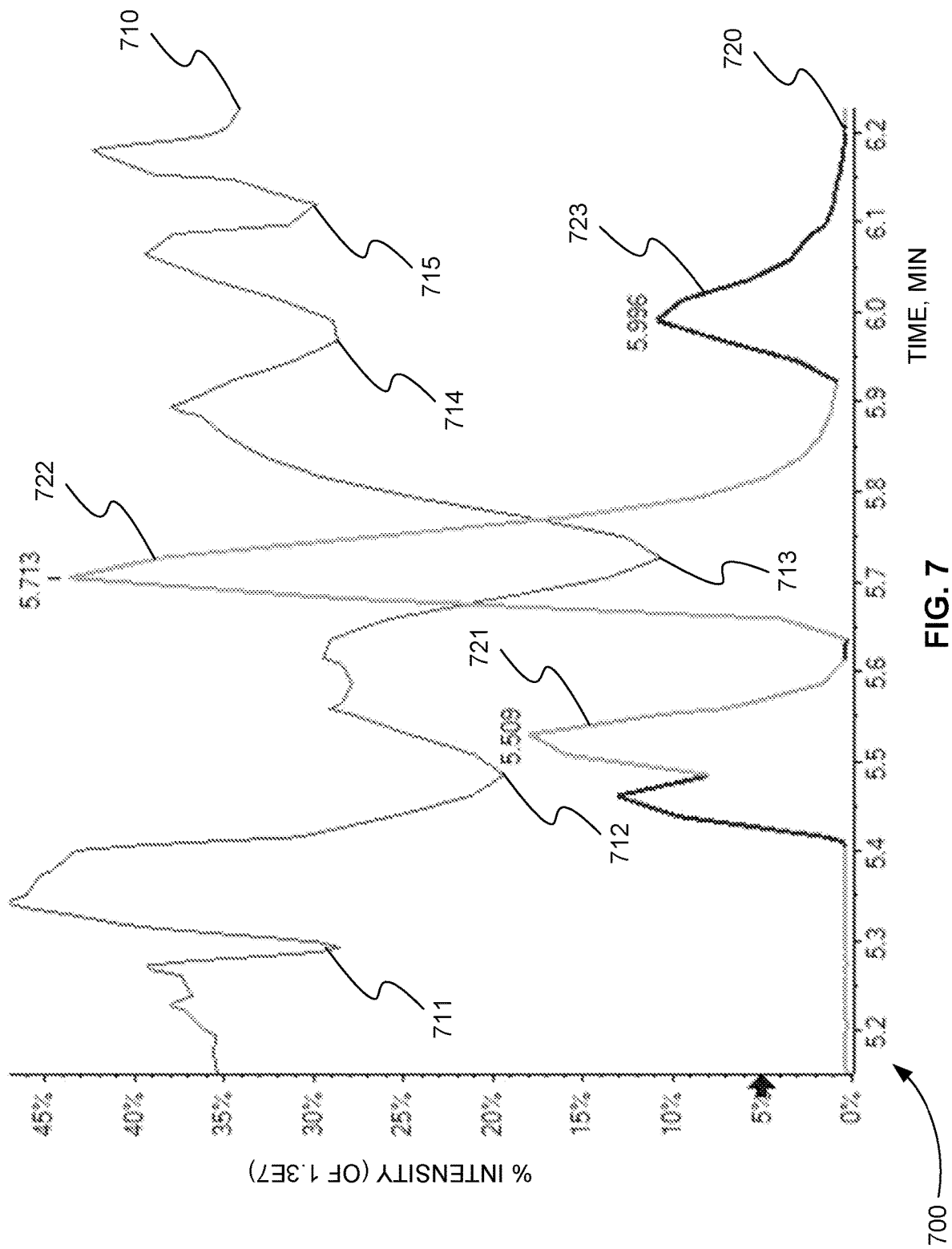
FIG. 7 is an exemplary plot of a comparison of a zoomed portion of an extracted ion chromatogram (XIC) for a single background ion and of a base peak chromatogram (BPC) showing how a drop in the intensity of the background ion correlates to compounds eluting from a liquid chromatography (LC) column, in accordance with various embodiments.

FIG. 7 is an exemplary plot 700 of a comparison of a zoomed portion of an extracted ion chromatogram (XIC) for a single background ion and of a base peak chromatogram (BPC) showing how a drop in the intensity of the background ion correlates to compounds eluting from a liquid chromatography (LC) column, in accordance with various embodiments. Trace 710 is a portion of the XIC for the background ion. Trace 720 is a portion of the BPC.

Trace 720 includes convolved peak 721, peak 722, and peak 723 representing the elution times of at least three compounds separating from the LC column. Trace 710 includes at least five significant drops in intensity or inverted peaks of the background ion. These drops in intensity are drops 711, 712, 713, 714, and 715.

In various embodiments, a significant drop in a trace for one or more background ions is defined as a decrease in the intensity measurement of the one or more background ions over a time period that exceeds a threshold decrease in intensity with respect to time. In other words, a significant drop is a decrease in the intensity gradient that exceeds a threshold decrease. The threshold is a decrease in the gradient that is larger than any random decrease experience by background ions. It is found, for example, experimentally by analyzing the response of background ions in relation to the separation of known compounds.

Plot 700 shows that the peaks 721, 722, and 723 of eluting compounds are correlated to drops 712, 713, and 714, respectively, in intensity of the background ion. Thus, plot 700 confirms that drops in the intensity of background ions can be used to detect the elution of unknown compounds.

The fact that drops 711 and 715 do not correlate to peaks in trace 720 does not mean that they are not predicting the elution of a compound from the LC column. Trace 720 is a portion of the BPC. The BPC only includes the most intense eluting ions. As a result, drops 711 and 715 likely correspond or correlate to the elution of less intense eluting ions.

Further, the correlation of the drop in the intensity of a background ion with the elution of a compound from an LC column has been observed using different time-of-flight (TOF) mass analyzers and using different ion source devices (e.g., IonDrive, DuoSpray).

An experiment was also conducted to confirm that the drop in the background ion signal was not due to signal attenuation from the dynamic ion transmission control (ITC) of a TOF mass analyzer. This was confirmed by comparing a trace of the ITC level with an XIC for a single background ion and a BPC.

Figure 8:
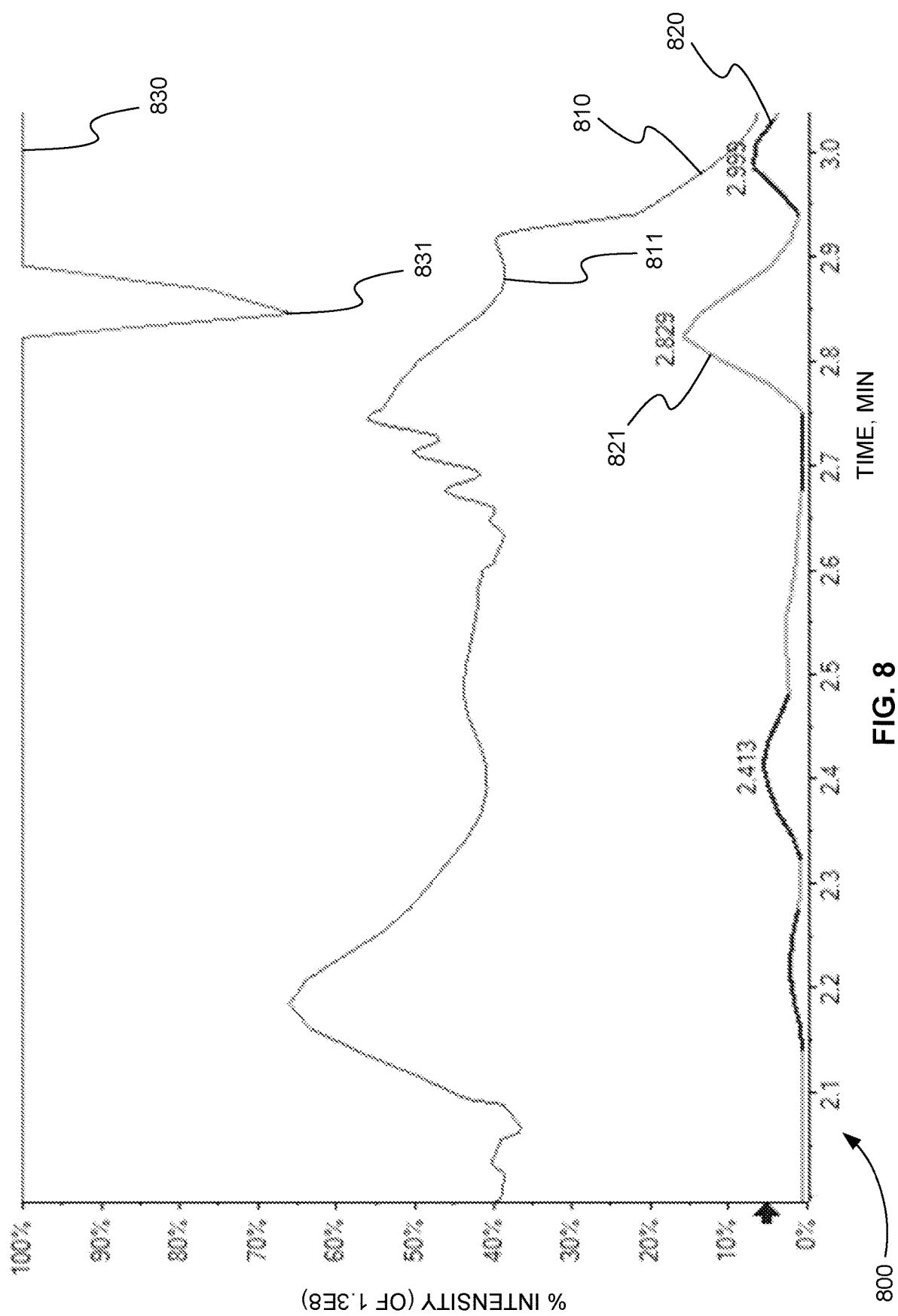
FIG. 8 is an exemplary plot of a comparison of a zoomed portion of a trace of the dynamic ion transmission control (ITC) of the TOF mass analyzer used, an XIC for a single background ion, and a BPC showing that a drop in the intensity of the background ion is not due to signal attenuation from the ITC, in accordance with various embodiments.

FIG. 8 is an exemplary plot 800 of a comparison of a zoomed portion of a trace of the dynamic ion transmission control (ITC) of the TOF mass analyzer used, an XIC for a single background ion, and a BPC showing that a drop in the intensity of the background ion is not due to signal attenuation from the ITC, in accordance with various embodiments. Trace 810 is a portion of the XIC for the background ion. Trace 820 is a portion of the BPC. Trace 830 is a portion of the ITC level of the TOF mass analyzer used.

Trace 830 shows one drop 831 in the ITC level. Drop 831 does not, however, appear to cause drop 811 in the intensity of the background ion. Drop 811 starts well before drop 831 and is well correlated to the start of peak 821 of trace 820. As a result, plot 800 shows that a drop in the intensity of the background ion is not due to signal attenuation from an ITC, but rather due to the elution of a compound.

In FIGS. 7 and 8, the XIC of a single background ion is compared to a BPC. In various embodiments, two or more background ions can be used to detect the separation of unknown compounds from a sample. The XICs of two or more background ions are combined and the combined XIC is compared to a BPC or TIC to detect the elution time of an unknown compound.

Figure 9:
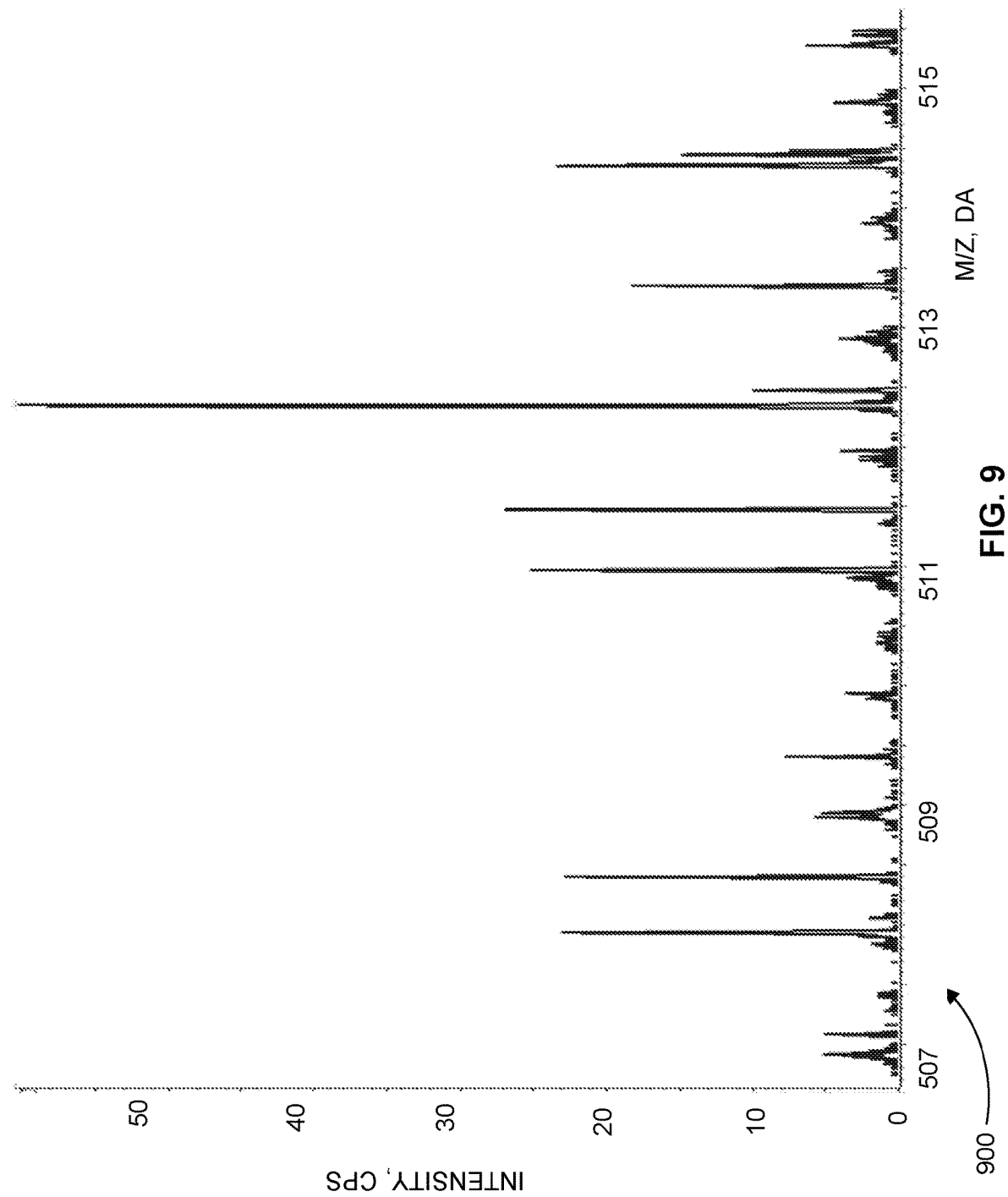
FIG. 9 is an exemplary plot of a portion of the mass spectrum of background ions produced by an ion source device, in accordance with various embodiments.

FIG. 9 is an exemplary plot 900 of a portion of the mass spectrum of background ions produced by an ion source device, in accordance with various embodiments. Plot 900 shows that a background ion that can be used to detect the separation of unknown compounds from a sample occurs at almost every mass-to-charge of the precursor ion mass range. As a result, a large number of background ions can be selected and used.

In the past, known trace molecules have been added to LC solvents to predict when compounds of interest are eluted. For example, sugar molecules or other known compounds with low basicity have been added to LC solvents in proteomics applications and monitored. When the sugar signal drops, an eluted peptide is detected.

Also, published International Patent Application Number WO2017034972 describes using background ion clusters to diagnose a deviation in the performance of an LC-MS system. It does not, however, suggest selecting background ions based on resolving power or using the intensity of background ions to detect a separation time of an unknown compound.

As described above, in various embodiments, the intensity of background ions is used to detect a separation time of an unknown compound that ionizes poorly in the ion source device or is fragmented within the ion source device. In various additional embodiments, features of the drop in intensity of background ions are compared to features of separating compound peaks to verify the features of the separating compound peaks or to even improve upon a feature of a poorly shaped separating compound peak. In various embodiments, a feature of a separation peak can be, but is not limited to, a central time of the separation peak, a start time of the separation peak, an end time of the separation peak, a shape of the separation peak, an area of the separation peak, or a FWHM of the separation peak.

Returning to FIG. 7, drop 714 is a drop in intensity of the background ion that corresponds to the separation peak 723 of a compound eluting from the LC column. The intensity of the background ion returns to a higher intensity after drop 714 as separation peak 723 diminishes. As a result, drop 714 is similar to an inverted separation peak. As a result, features may also be determined from inverted separation peak 714.

If, for example, separation peak 723 were an unknown compound with a very low intensity, it would be difficult to determine whether or not separation peak 723 is a real eluting compound or just noise. In various embodiments, inverted separation peak 714 is used to confirm that separation peak 723 is a real eluting compound. In this case, the feature of inverted separation peak 714 used to confirm separation peak 723 is the central time of the peaks.

In various alternative embodiments, any feature of inverted separation peak 714 can be compared to the corresponding feature of separation peak 723 to confirm that separation peak 723 is a real eluting compound. A total ion chromatogram (TIC) may contain thousands of separation peaks that need to be confirmed. Comparing these peaks with the drop in intensity of background ions can help address this significant problem in separation device coupled mass spectrometry.

Further, frequently compounds that ionize poorly or fragment within the ion source device yield poorly shaped separation peaks for integration purposes. In contrast, drops in intensity of the background ions may be of a higher intensity and therefore may produce better shaped inverted separation peaks. Features of these drops or inverted separation peaks can then be used to improve upon a feature of a corresponding poorly shaped separating compound peak. For example, start and stop times or the area of a corresponding poorly shaped separating compound peak may be improved by analyzing the start and stop times or the area of a corresponding inverted separation peak.

In various embodiments, the detection of a separating unknown compound using the intensity of one or more background ions may be used to trigger a mass spectrometry/mass spectrometry (MS/MS) scan. Such an MS/MS scan is used to create and measure product ions of the unknown compound that, in turn, can be used to further identify that compound.

As described above, IDA is an untargeted MS/MS method in which a precursor ion or MS survey scan is performed to generate a precursor ion peak list. The user can select criteria to filter the peak list for a subset of the precursor ions on the peak list. MS/MS is then performed on each precursor ion of the subset of precursor ions. A product ion spectrum is produced for each precursor ion. MS/MS is repeatedly performed on the precursor ions of the subset of precursor ions as the sample is being introduced into the tandem mass spectrometer.

In various embodiments, an IDA method is modified to include triggering an MS/MS scan of a mass range when no precursor ions on the peak list are detected in the MS scan. The MS/MS scan may be a single scan, an MS/MS' scan, or a SWATH scan of the mass range, for example.

Apparatus for Separation Detection

Figure 10:
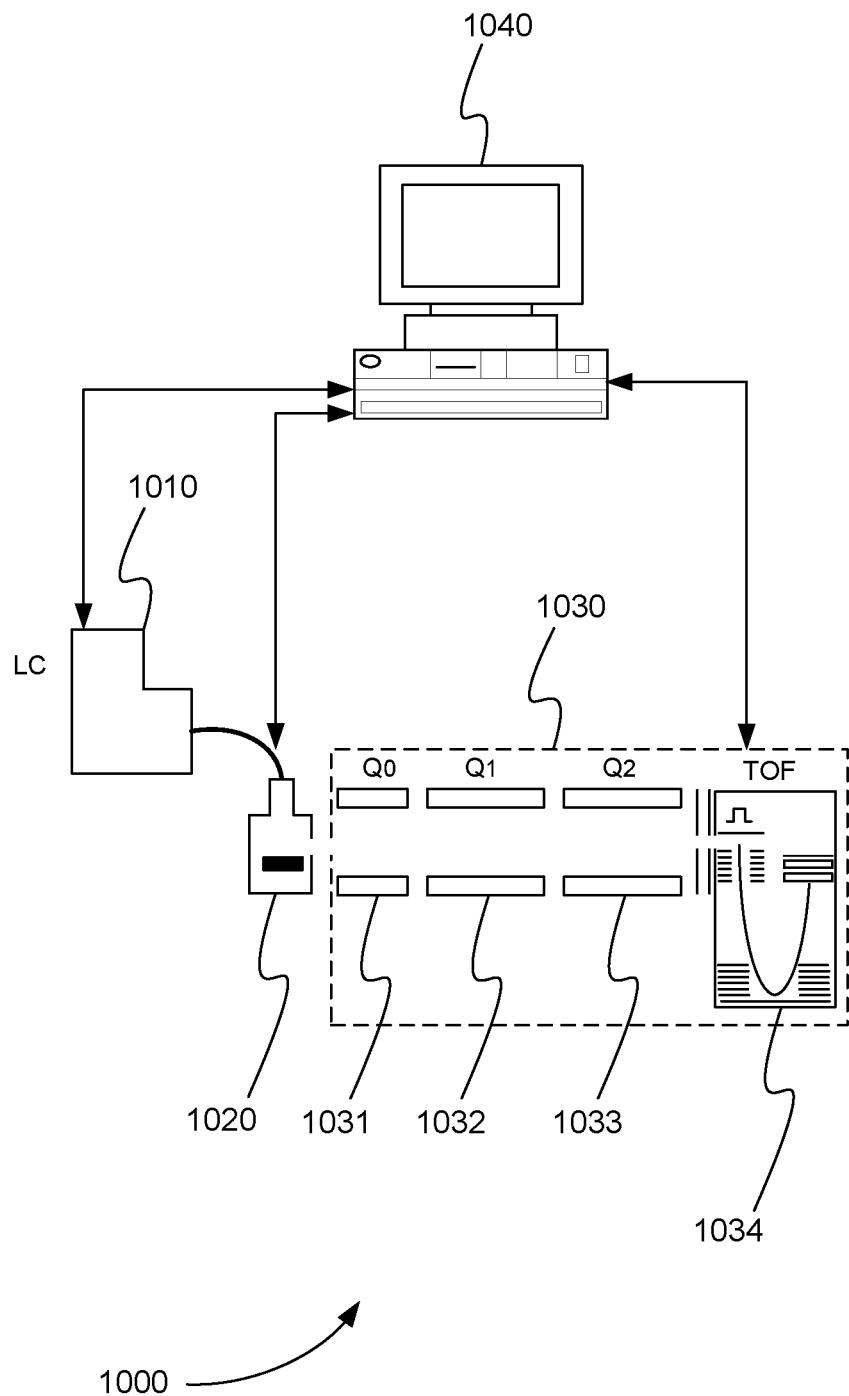
FIG. 10 is a schematic diagram of apparatus for detecting the separation of an unknown compound from a sample, in accordance with various embodiments.

FIG. 10 is a schematic diagram 1000 of apparatus for detecting the separation of an unknown compound from a sample, in accordance with various embodiments. The apparatus includes separation device 1010, ion source device 1020, and mass spectrometer 1030.

Separation device 1010 separates each of one or more unknown compounds from a sample over a separation time period based on a property of the one or more unknown compounds. Separation device 1010 can be, but is not limited to, a liquid chromatography (LC) device, a gas chromatography device, a capillary electrophoresis device, or an ion mobility device. In a preferred embodiment, separation device 1010 is an LC column that separates the sample over the separation time based on the elution of the one or more compounds through the LC column.

Ion source device 1020 ionizes separated compounds received from the separation device. One or more compound precursor ions are produced for each of the one or more unknown compounds, and a plurality of background precursor ions are also produced. More than one precursor ion may be produced for a single unknown compound, for example, if the single unknown compound is fragmented by ion source device 1020.

Ion source device 1020 can be, but is not limited to, an electrospray ion source (ESI) device, an electron impact source and a fast atom bombardment source device, an atmospheric pressure chemical ionization source (APCI) device, atmospheric pressure photoionization (APPI) source device, or a matrix-assisted laser desorption source (MALDI) device. In a preferred embodiment, ion source device 1020 is an ESI device.

Mass spectrometer 1030 includes mass analyzer 1034. Mass analyzer 1034 measures a precursor ion mass spectrum for the combined compound and background precursor ions received from ion source device 1020 at each time step of a plurality of time steps spread across the separation time period, producing a plurality of precursor ion mass spectra.

Mass spectrometer 1030 selects one or more background precursor ions from the plurality of precursor ion mass spectra that have a resolving power in a range below a threshold resolving power expected for mass analyzer 1034. Mass spectrometer 1030 detects a separation time for one of the one or more unknown compounds when a decrease in an intensity measurement of the one or more selected background precursor ions over a time period exceeds a threshold decrease in intensity with respect to time.

Mass analyzer 1034 can be, but is not limited to, a time-of-flight (TOF) mass analyzer, a quadrupole, an ion trap, a linear ion trap, an orbitrap, a magnetic four-sector mass analyzer, a hybrid quadrupole time-of-flight (Q-TOF) mass analyzer, or a Fourier transform mass analyzer. In a preferred embodiment, mass analyzer 1034 is a TOF mass analyzer.

In various embodiments, the resolving power of a precursor ion is calculated by dividing a center mass-to-charge ratio (m/z) of a mass-to-charge ratio (m/z) peak of the precursor ion by a full width at half maximum (FWHM) of the m/z peak.

In various embodiments, the one or more background ions selected have a resolving power in a resolving power between 4,000 and 8,000.

In various embodiments, the threshold resolving power expected for mass analyzer 1034 is 30,000.

In various embodiments, when mass spectrometer 1030 detects the separation time, it reports a confirmation to a user of mass spectrometer 1030 that a compound is successfully sampled from the sample.

In various embodiments, when a decrease in an intensity measurement of the one or more selected background precursor ions over a time period exceeds a threshold decrease in intensity with respect to time, mass spectrometer 1030 further calculates a corresponding increase in an intensity measurement of the one or more selected background precursor ions over a time period. As a result, a calculated inverted separation peak for the one or more background ions is produced.

In various embodiments, mass spectrometer 1030 further calculates an extracted ion chromatogram (XIC) for one or more precursor ions of the plurality of precursor ion mass spectra. It identifies a feature of a separation peak of the XIC. Finally, it compares the feature of the separation peak to a feature of the inverted separation peak to confirm the feature of the separation peak of the XIC.

In various embodiments, a feature of a separation peak can be, but is not limited to, a central time of the separation peak, a start time of the separation peak, an end time of the separation peak, a shape of the separation peak, an area of the separation peak, or a full width at half maximum (FWHM) of the separation peak.

In various embodiments, mass spectrometer 1030 further includes mass filter 1032 and fragmentation device 1033. When mass spectrometer 1030 detects the separation time, mass filter 1032 selects a mass range and fragmentation device 1033 fragments all precursor ions in the mass range, producing one or more product ion mass spectra.

In various embodiments, when mass spectrometer 1030 detects the separation time in an information dependent acquisition (IDA) method and no mass-to-charge ratio (m/z) peaks of an IDA method peak list are detected, mass filter 1032 selects a mass range and fragmentation device 1033 fragments all precursor ions in the mass range. One or more product ion mass spectra are produced.

In various embodiments, the apparatus of FIG. 10 further includes processor 1040 for controlling separation device 1010, ion source device 1020, and mass spectrometer 1030 and analyzing the data collected. Processor 1040 can be a separate device as shown in FIG. 10 or can be a processor or controller of separation device 1010, ion source device 1020, or mass spectrometer 1030, for example. Processor 1040 can be, but is not limited to, a controller, a computer, a microprocessor, the computer system of FIG. 1, or any device capable of sending and receiving control signals and data. In various embodiments, mass spectrometer 1030 further includes ion guide 1031.

Method for Separation Detection

Figure 11:
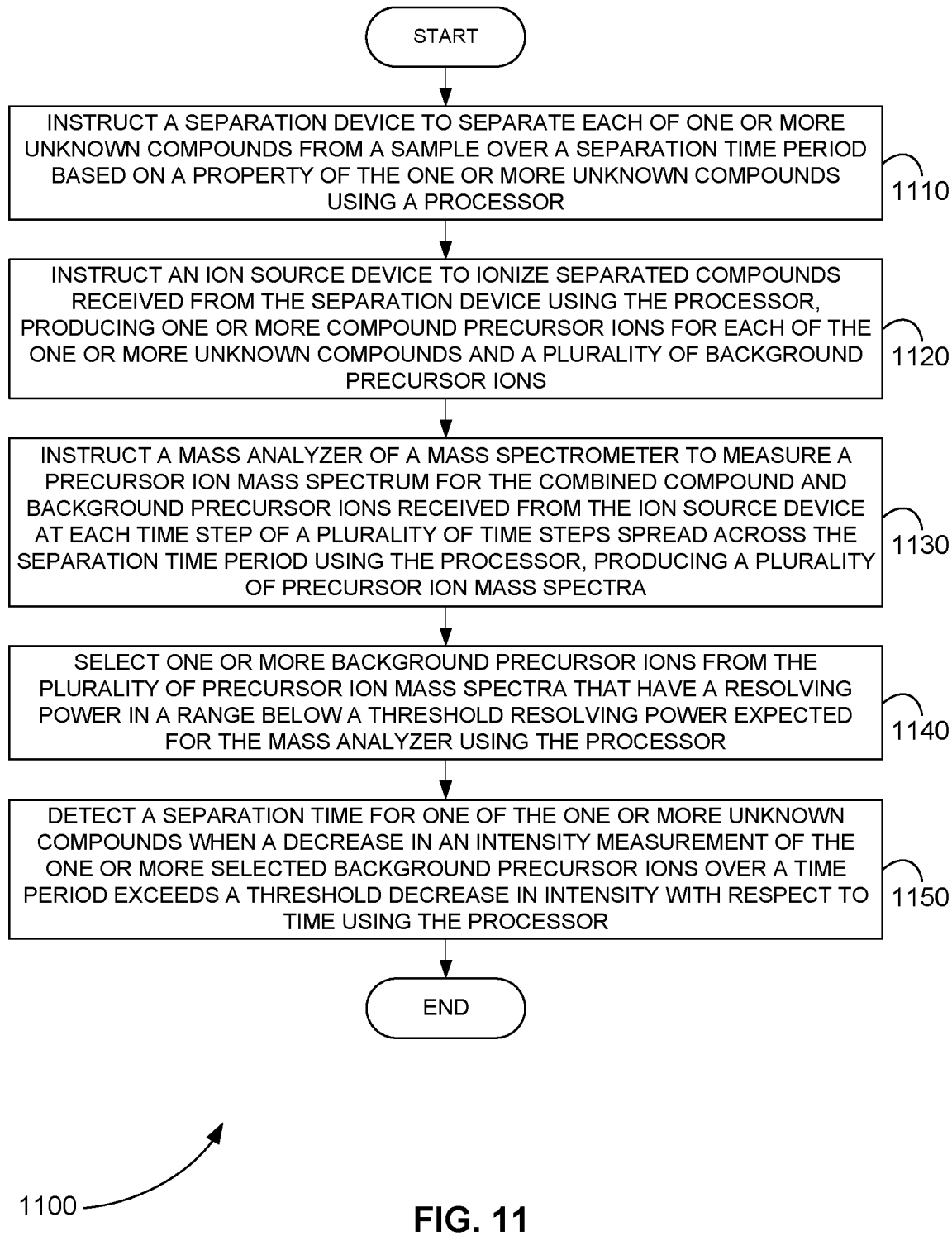
FIG. 11 is a flowchart showing a method for detecting the separation of an unknown compound from a sample, in accordance with various embodiments.

FIG. 11 is a flowchart showing a method 1100 for detecting the separation of an unknown compound from a sample, in accordance with various embodiments.

In step 1110 of method 1100, a separation device is instructed to separate each of one or more unknown compounds from a sample over a separation time period based on a property of the one or more unknown compounds using a processor.

In step 1120, an ion source device is instructed to ionize separated compounds received from the separation device using the processor. One or more compound precursor ions for each of the one or more unknown compounds and a plurality of background precursor ions are produced.

In step 1130, instruct a mass analyzer of a mass spectrometer to measure a precursor ion mass spectrum for the combined compound and background precursor ions received from the ion source device at each time step of a plurality of time steps spread across the separation time period. A plurality of precursor ion mass spectra is produced.

In step 1140, one or more background precursor ions are selected from the plurality of precursor ion mass spectra that have a resolving power in a range below a threshold resolving power expected for the mass analyzer using the processor.

In step 1150, a separation time is detected for one of the one or more unknown compounds when a decrease in an intensity measurement of the one or more selected background precursor ions over a time period exceeds a threshold decrease in intensity with respect to time using the processor.

Computer Program Product for Separation Detection

In various embodiments, computer program products include a tangible computer-readable storage medium whose contents include a program with instructions being executed on a processor so as to perform a method for detecting the separation of an unknown compound from a sample. This method is performed by a system that includes one or more distinct software modules.

Figure 12:
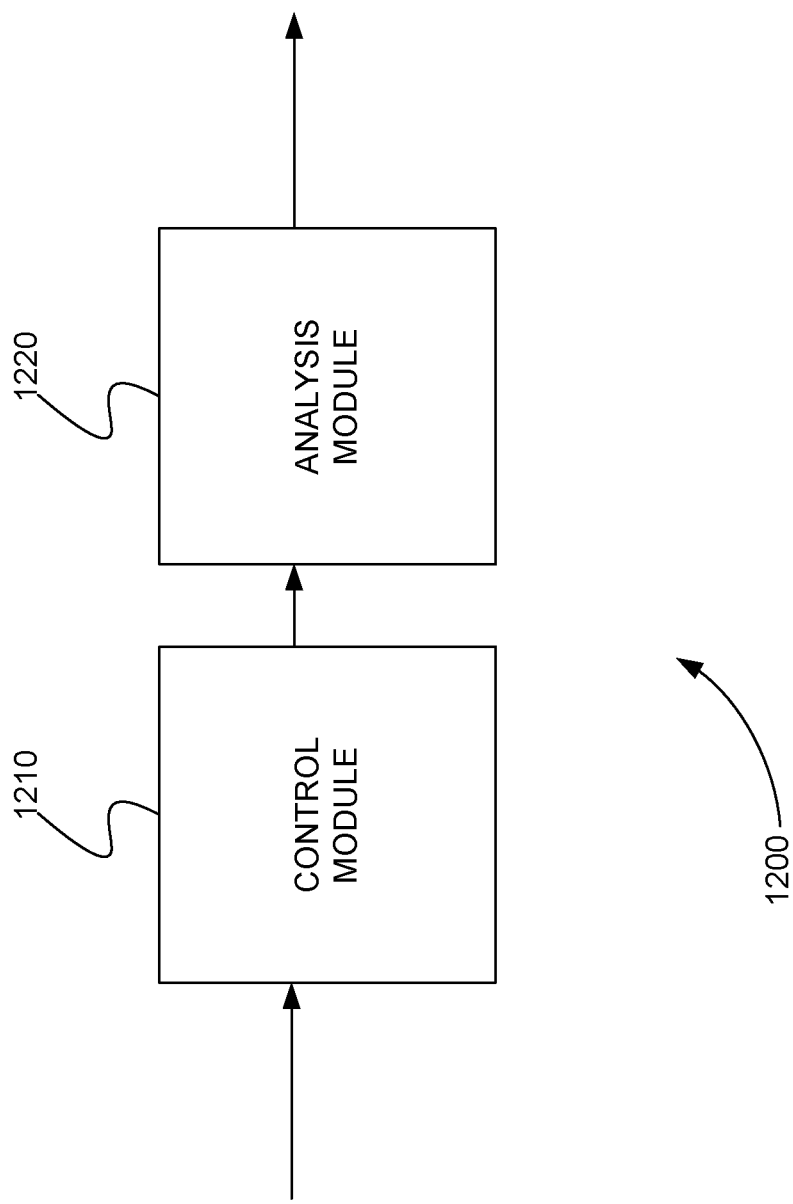
FIG. 12 is a schematic diagram of a system that includes one or more distinct software modules that performs a method for detecting the separation of an unknown compound from a sample, in accordance with various embodiments.

FIG. 12 is a schematic diagram of a system 1200 that includes one or more distinct software modules that performs a method for detecting the separation of an unknown compound from a sample, in accordance with various embodiments. System 1200 includes control module 1210 and analysis module 1220.

Control module 1210 instructs a separation device to separate each of one or more unknown compounds from a sample over a separation time period based on a property of the one or more unknown compounds. Control module 1210 instructs an ion source device to ionize separated compounds received from the separation device. One or more compound precursor ions for each of the one or more unknown compounds and a plurality of background precursor ions are produced. Control module 1210 instructs a mass analyzer of a mass spectrometer to measure a precursor ion mass spectrum for the combined compound and background precursor ions received from the ion source device at each time step of a plurality of time steps spread across the separation time period. A plurality of precursor ion mass spectra is produced.

Analysis module 1220 selects one or more background precursor ions from the plurality of precursor ion mass spectra that have a resolving power in a range below a threshold resolving power expected for the mass analyzer. Analysis module 1220 detects a separation time for one of the one or more unknown compounds when a decrease in an intensity measurement of the one or more selected background precursor ions over a time period exceeds a threshold decrease in intensity with respect to time.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. Apparatus for detecting the separation of an unknown compound from a sample, comprising:
    a separation device that separates each of one or more unknown compounds from a sample over a separation time period based on a property of the one or more unknown compounds;
    an ion source device that ionizes separated compounds received from the separation device, producing one or more compound precursor ions for each of the one or more unknown compounds and a plurality of background precursor ions;
    a mass spectrometer that includes a mass analyzer, wherein the mass analyzer measures a precursor ion mass spectrum for the combined compound and background precursor ions received from the ion source device at each time step of a plurality of time steps spread across the separation time period, producing a plurality of precursor ion mass spectra, wherein the mass spectrometer selects one or more background precursor ions from the plurality of precursor ion mass spectra that have a resolving power in a range below a threshold resolving power expected for the mass analyzer, and wherein the mass spectrometer detects a separation time for one of the one or more unknown compounds when a decrease in an intensity measurement of the one or more selected background precursor ions over a time period exceeds a threshold decrease in intensity with respect to time.

2. The apparatus of claim 1, wherein the resolving power of a precursor ion comprises a center mass-to-charge ratio (m/z) of a mass-to-charge ratio (m/z) peak of the precursor ion divided by a full width at half maximum (FWHM) of the m/z peak.

3. The apparatus of claim 2, wherein the range comprises a resolving power between 4,000 and 8,000.

4. The apparatus of claim 2, wherein the threshold resolving power comprises 30,000.

5. The apparatus of claim 1, wherein the separation device comprises a liquid chromatography device, a gas chromatography device, a capillary electrophoresis device, or an ion mobility device.

6. The apparatus of claim 1, wherein the ion source device comprises an electrospray ion source (ESI) device, an electron impact source and a fast atom bombardment source device, an atmospheric pressure chemical ionization source (APCI) device, atmospheric pressure photoionization (APPI) source device, or a matrix-assisted laser desorption source (MALDI) device.

7. The apparatus of claim 1, wherein the mass analyzer comprises a time-of-flight (TOF) mass analyzer, a quadrupole, an ion trap, a linear ion trap, an orbitrap, a magnetic four-sector mass analyzer, a hybrid quadrupole time-of-flight (Q-TOF) mass analyzer, or a Fourier transform mass analyzer.

8. The apparatus of claim 1, wherein when the mass spectrometer detects the separation time, the mass spectrometer reports a confirmation to a user of the mass spectrometer that a compound is successfully sampled from the sample.

9. The apparatus of claim 1, wherein when a decrease in an intensity measurement of the one or more selected background precursor ions over a time period exceeds a threshold decrease in intensity with respect to time, the mass spectrometer further calculates a corresponding increase in an intensity measurement of the one or more selected background precursor ions over a time period, producing a calculated inverted separation peak for the one or more background ions.

10. The apparatus of claim 9, the mass spectrometer further calculates an extracted ion chromatogram (XIC) for one or more precursor ions of the plurality of precursor ion mass spectra, identifies a feature of a separation peak of the XIC, and compares the feature of the separation peak to a feature of the inverted separation peak to confirm the feature of the separation peak of the XIC.

11. The apparatus of claim 10, wherein a feature of a separation peak comprises a central time of the separation peak, a start time of the separation peak, an end time of the separation peak, a shape of the separation peak, an area of the separation peak, or a full width at half maximum (FWHM) of the separation peak.

12. The apparatus of claim 1, wherein the mass spectrometer further includes a mass filter and a fragmentation device and wherein when the mass spectrometer detects the separation time, the mass filter selects a mass range and the fragmentation device fragments all precursor ions in the mass range, producing one or more product ion mass spectra.

13. The apparatus of claim 12, wherein when the mass spectrometer detects the separation time in an information dependent acquisition (IDA) method and no mass-to-charge ratio (m/z) peaks of an IDA method peak list are detected, the mass filter selects a mass range and the fragmentation device fragments all precursor ions in the mass range, producing one or more product ion mass spectra.

14. A method for detecting the separation of an unknown compound from a sample, comprising:
  instructing a separation device to separate each of one or more unknown compounds from a sample over a separation time period based on a property of the one or more unknown compounds using a processor;
  instructing an ion source device to ionize separated compounds received from the separation device using the processor, producing one or more compound precursor ions for each of the one or more unknown compounds and a plurality of background precursor ions;
  instructing a mass analyzer of a mass spectrometer to measure a precursor ion mass spectrum for the combined compound and background precursor ions received from the ion source device at each time step of a plurality of time steps spread across the separation time period using the processor, producing a plurality of precursor ion mass spectra;
  selecting one or more background precursor ions from the plurality of precursor ion mass spectra that have a resolving power in a range below a threshold resolving power expected for the mass analyzer using the processor; and
  detecting a separation time for one of the one or more unknown compounds when a decrease in an intensity measurement of the one or more selected background precursor ions over a time period exceeds a threshold decrease in intensity with respect to time using the processor.

15. A computer program product, comprising a non-transitory and tangible computer-readable storage medium whose contents include a program with instructions being executed on a processor so as to perform a method for detecting the separation of an unknown compound from a sample, the method comprising:
  providing a system, wherein the system comprises one or more distinct software modules, and wherein the distinct software modules comprise a control module and an analysis module;
  instructing a separation device to separate each of one or more unknown compounds from a sample over a separation time period based on a property of the one or more unknown compounds using the control module;
  instructing an ion source device to ionize separated compounds received from the separation device using the control module, producing one or more compound precursor ions for each of the one or more unknown compounds and a plurality of background precursor ions;
  instructing a mass analyzer of a mass spectrometer to measure a precursor ion mass spectrum for the combined compound and background precursor ions received from the ion source device at each time step of a plurality of time steps spread across the separation time period using the control module, producing a plurality of precursor ion mass spectra;
  selecting one or more background precursor ions from the plurality of precursor ion mass spectra that have a resolving power in a range below a threshold resolving power expected for the mass analyzer using the analysis module; and
  detecting a separation time for one of the one or more unknown compounds when a decrease in an intensity measurement of the one or more selected background precursor ions over a time period exceeds a threshold decrease in intensity with respect to time using the analysis module.

* * * * *